United States Patent
Walsh

[11] Patent Number: 5,936,765
[45] Date of Patent: Aug. 10, 1999

[54] CAN TELESCOPE

[76] Inventor: Daniel M. Walsh, 2005 Pinto La., Las Vegas, Nev. 89106

[21] Appl. No.: 09/006,060

[22] Filed: Jan. 12, 1998

[51] Int. Cl.$^6$ ............................ G02B 23/08; G02B 23/00
[52] U.S. Cl. .......................... 359/399; 359/406; 359/413
[58] Field of Search ..................... 359/399–420, 359/503–506, 802–811, 480–482; D16/133; D7/509

[56] References Cited

U.S. PATENT DOCUMENTS

| | | | |
|---|---|---|---|
| 53,115 | 3/1866 | Clark | 359/406 |
| 1,175,609 | 3/1916 | Cottrell | 359/406 |
| 2,655,076 | 10/1953 | Armstrong | 359/410 |
| 2,968,208 | 1/1961 | Shaw | 359/406 |
| 3,397,935 | 8/1968 | Natsume | 359/413 |
| 4,770,519 | 9/1988 | Jacques | 359/408 |
| 4,968,125 | 11/1990 | Rodriquez | 359/802 |

FOREIGN PATENT DOCUMENTS

| | | | |
|---|---|---|---|
| 62-38409 | 2/1987 | Japan | 359/399 |

*Primary Examiner*—Thong Nguyen
*Attorney, Agent, or Firm*—David A. Lingbeck

[57] ABSTRACT

A can telescope includes a can being of a container having a front end and a back end, a removable lens cap at the back end and a removable can lid also at the back end, the can being that of a pop or soda can. The can telescope also includes a base tubular section which is smaller than the container and which is secured inside the container, and further includes three telescopic tubular sections in which one slides into and is extended from another. The container has a storage compartment inside thereof, which is defined as being between the side wall of the container and the side wall of the base tubular section. The storage compartment can be accessed through the back end of the container upon removal of the removable can lid. Objects and liquids can be stored in the storage compartment. When not in use, the can telescope has the appearance that of a pop or soda can and is an ideal souvenir.

9 Claims, 4 Drawing Sheets

CAN TELESCOPE

BACKGROUND OF THE INVENTION

This invention relates to a can telescope which is a pop or soda can with a telescope which is disguised as and stored essentially in a pop or soda can but which has tubular sections which can be extended and used as a telescope.

Telescopes are old in the art and have been used by astronomers and on ships for centuries and include multiple sections with the smaller sections being extendably contained in the larger sections; wherein, each of the sections has a lens for viewing objects or people at a distance.

One known prior art is an ALTISCOPE, U.S. Pat. No. 53,115, invented by J. Clark and issued on Mar. 13, 1866, which comprises a telescopic column of tubes and an arrangement of mirrors and lens.

Another known prior art is an OPTICAL SIGHTING DEVICE, U.S. Pat. No. 2,655,076, invented by Harold Armstrong and issued on Oct. 13, 1953, which comprises telescoping tubes, means for longitudinally adjusting the telescopic tubes with respect to each other, a handle for supporting the device, and a finger operated slide for focusing the device.

None of the prior art utilizes a can as a telescope not only for souvenir purposes but also as a functional telescope which has a storage compartment for storing objects and liquids.

SUMMARY OF THE INVENTION

This invention relates to a can telescope which comprises a can being that of a pop or soda can and including a container having a removable lens cap at the back end and a removable cap lid at the back end thereof and further includes four tubular sections each being of a different size which includes a base section which is securely attached inside the container and which has a lens at one end thereof and further includes three telescopic tubular sections where one telescopic tubular section slides within another telescopic tubular section. The can telescope also has a storage compartment which is defined between the side wall of the container and the side wall of the base tubular section, for storing objects or even liquids.

One objective of the present invention is to provide a can telescope which is lightweight and which will make an ideal souvenir for the user because it is disguised as a real pop or soda can.

Another objective of the present invention is to provide a can telescope which has a storage compartment for storing objects and even liquids much like a regular pop can.

Yet, another objective of the present invention is to provide a can telescope which is a pop can which is used as a telescope having up to 20 times the magnifying power for seeing distant objects.

Further objectives and advantages of the present invention will become apparent as the description proceeds and when taken in conjunction with the accompanying drawings wherein:

DETAILED DESCRIPTION OF THE INVENTION

Figure 1:
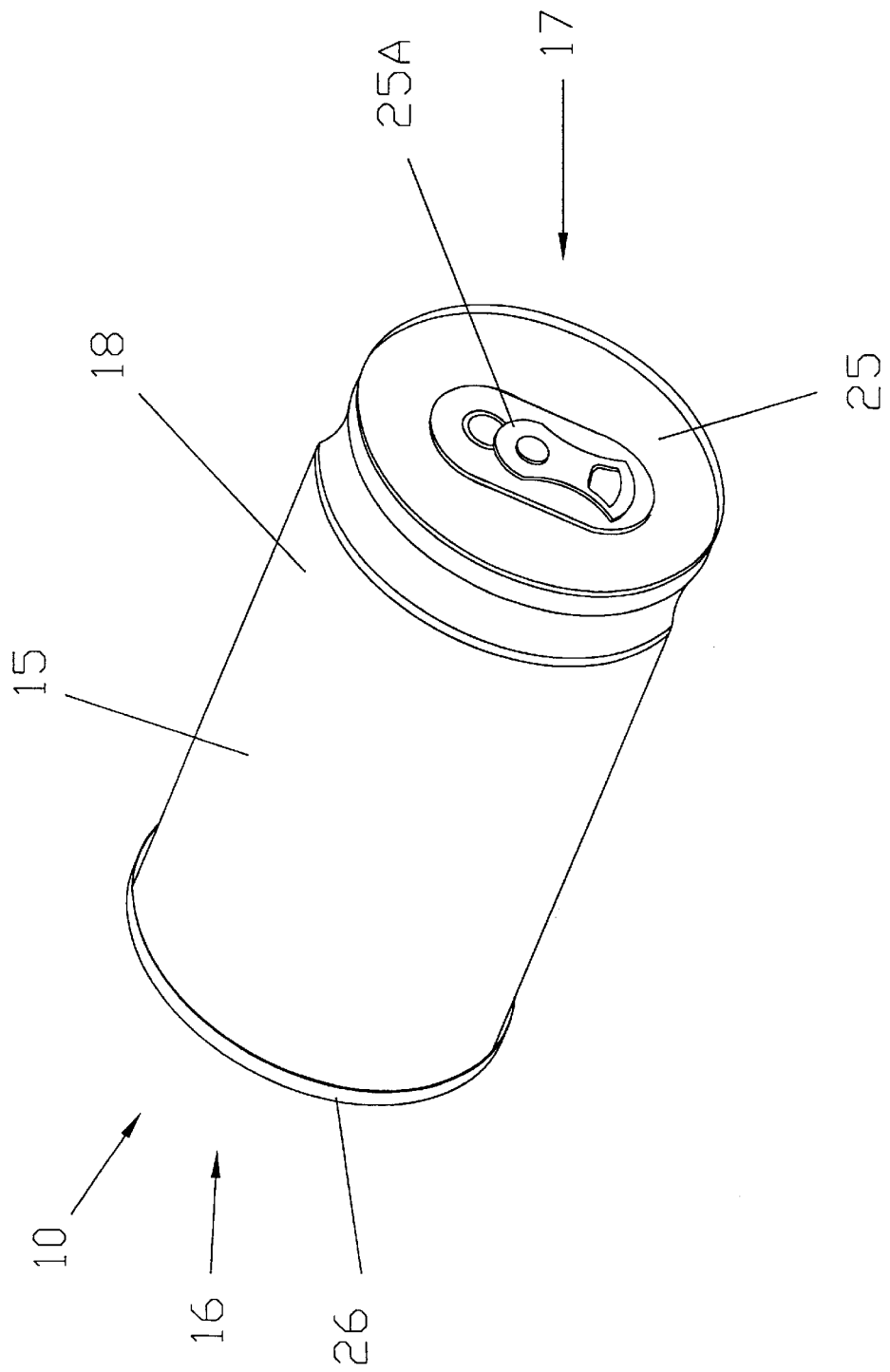
FIG. 1 is a rear perspective view of the can telescope.
Figure 2:
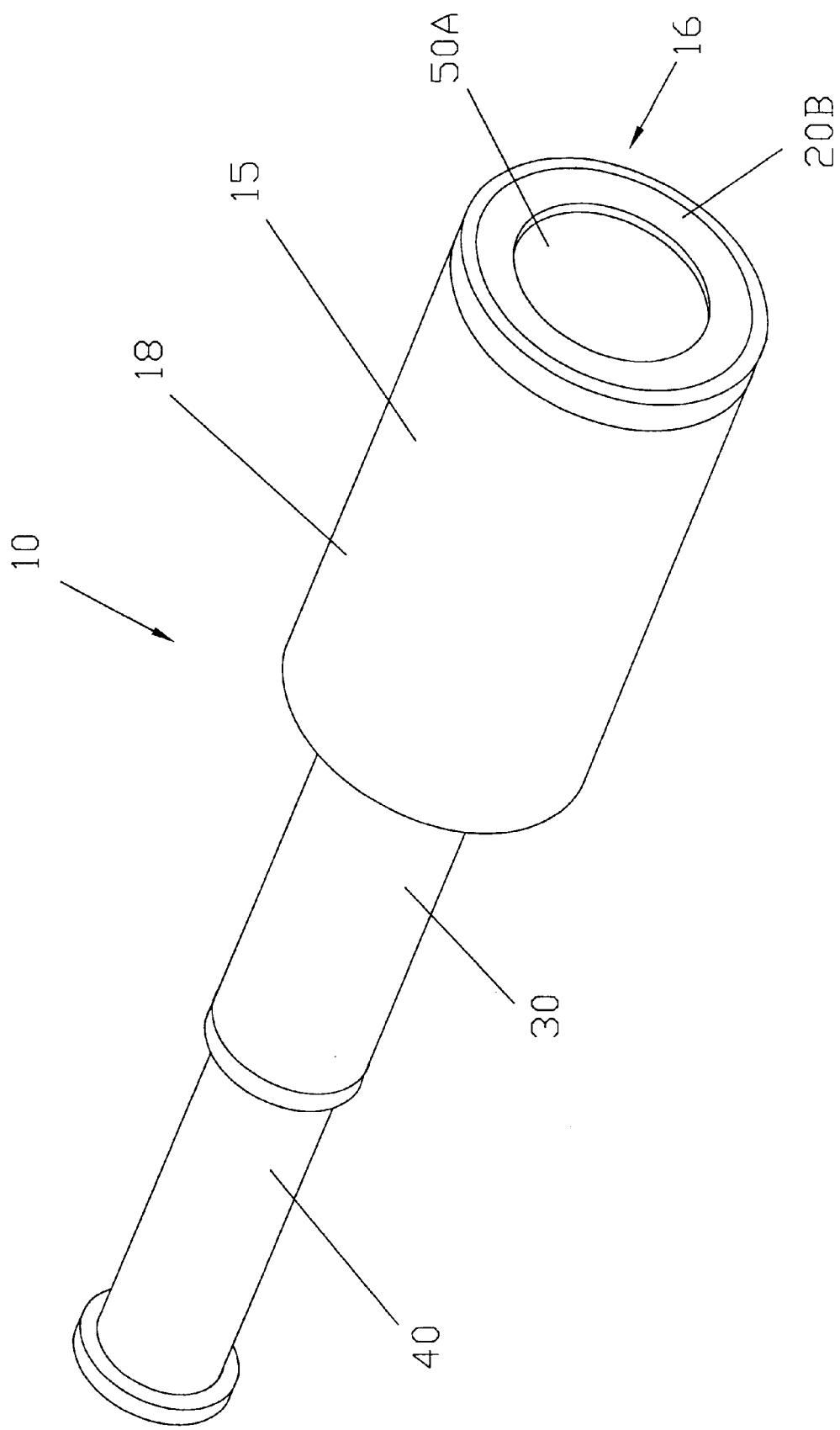
FIG. 2 is a front perspective view of the can telescope with the telescopic sections extended.

Referring to the drawings in FIGS. 1–4, in particular, the can telescope 10 comprises a can being of a cylindrical container 15 preferably made of aluminum and having a side wall 18 and a removable compartment cap 26 at the back end 17 and a removable can lid 25 also at the back end 17 thereof with an annular void area 25B in the top thereof for storing a flexible line (not shown) which is primarily used to carry the can telescope 10 around one's neck for example, the removable compartment cap 26 being a ring with an opening therethrough and the removable can lid 25 being like that of a top end of the pop or soda can having a pop can opener ring 25A, and further comprises a base tubular section 20 which is disposed inside of and fixedly attached at the front end 16 of the container 15 and has a side wall 20a and a front end 20b and a circumference smaller than that of the container 15 so as to define an annular storage compartment 19 between the side wall 20a of base tubular section 20 and the side wall 18 of the container 15, and also comprises two telescopic tubular sections 30,40 of different sizes, all of which are slidable within the base tubular section 20 with one telescopic tubular section 40 being slidable within another telescopic tubular section 30,40.

Each of the tubular sections 30,40 has a lens 50a–d secured at the front end thereof and disposed perpendicular to the longitudinal axis of the respective tubular section for looking therethrough to view distant objects, and further has a flange portion 20c,30c,40c at the front end thereof and extending outwardly relative to the side wall of the respective tubular section for securing the base tubular section 20 inside the container 15 and for preventing one telescopic tubular section from sliding completely out of another telescopic tubular section. One telescopic tubular section can be extended from another telescopic tubular section but is limited as to how far it can be extended, because the respective flange portion 20c,30c,40c of the one telescopic tubular section being extended comes into contact with and is stopped by a stopper member 20d,30d of the other telescopic tubular section of which the one telescopic tubular section is being extended from. Each of the stopper members 20d,30d is disposed on the interior of the side wall and at the back end of the respective telescopic tubular section which is adapted to receive another telescopic tubular section.

Figure 3:
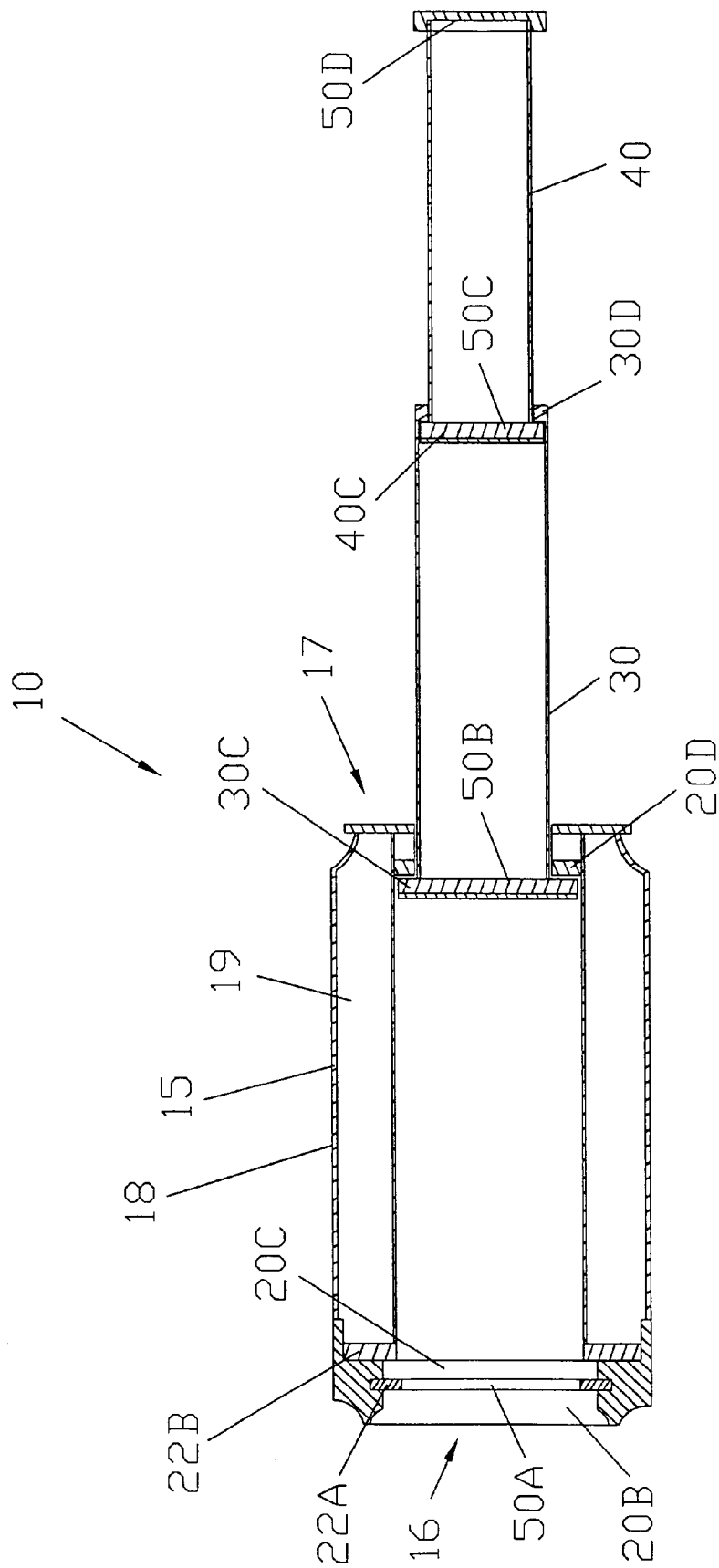
FIG. 3 is a cross-sectional side view of the can telescope with the telescopic sections extended.
Figure 4:
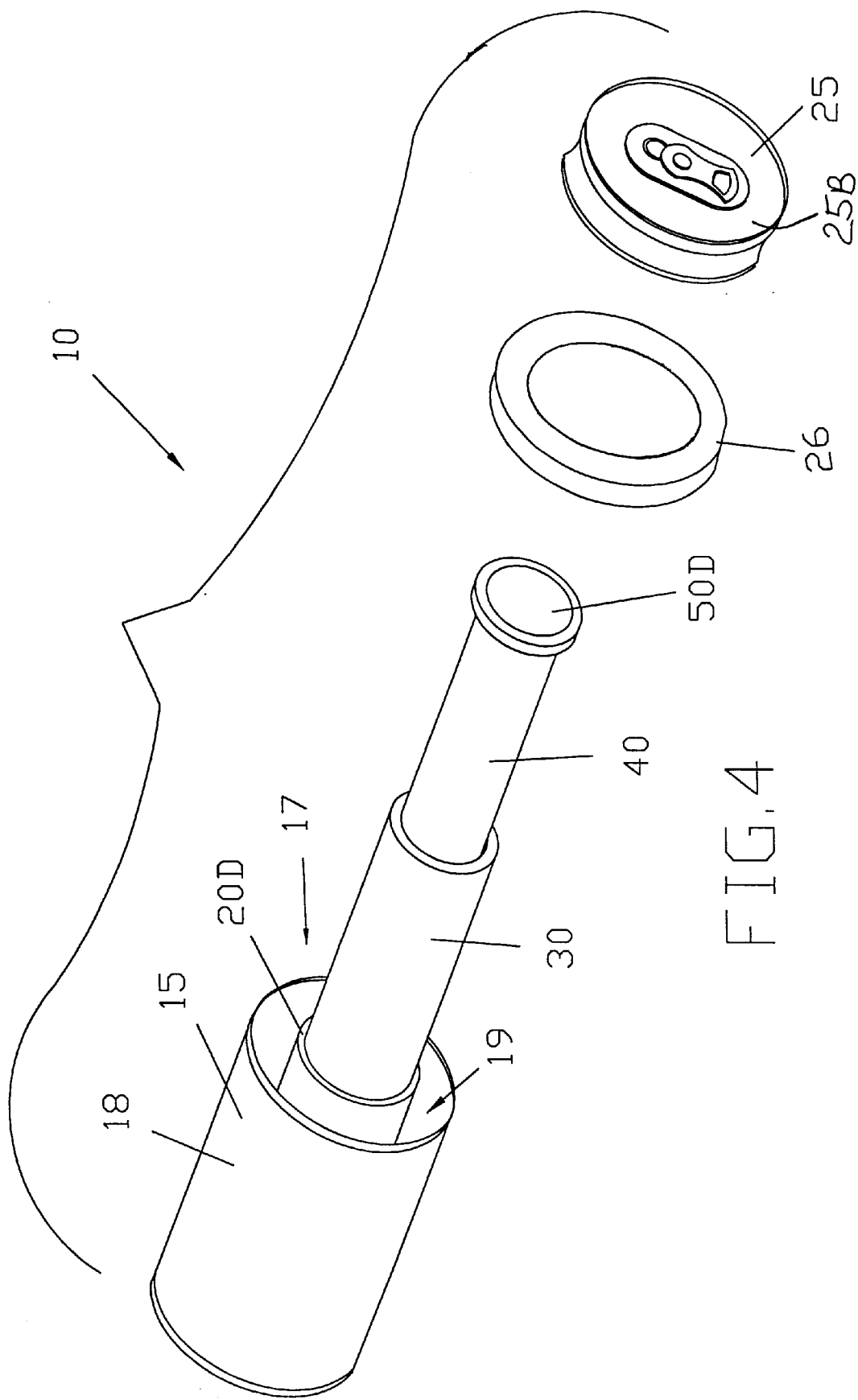
FIG. 4 is a rear exploded perspective view of the can telescope with the telescopic sections extended.

As shown in FIG. 3, the base tubular section 20 is securely retained inside the can by means of the respective flange portion 20c and two ring gaskets 22a–b which are preferably made of plastic and which are fixedly attached to the interior of the side wall 18 of the container 15 and to either side of the flange portion 20c to prevent the base tubular section 20 from being removed from within the container 15 and to make the front end 16 of the can essentially leak resistant so that should the user want to put liquid in the storage compartment 19 of the container 15, the liquid will not leak out of the container 15 through the front end 16. In addition, the storage compartment 19 is adapted to store objects which may be used in conjunction with the telescope such as maps and sports programs.

To use the can telescope 10, the user removes the removable compartment cap 26 and the removable can lid 25 from the can and extends the telescopic tubular sections 30,40 so that the user can look through the eyepiece, which is the telescopic tubular section farthest removed from the base tubular section 20, and through the can which is now opened at its front and back ends. Once the user is finished with using the can telescope 10, the user slides the telescopic tubular sections 30,40 into one another and into the base tubular section 20 and into the can and then closes the can with the removable compartment cap 26 and the removable compartment lid 25. If the user wants to keep objects for use with the can telescope 10, the user can remove the removable can lid 25 and put the objects in the storage compartment 19 inside the can and reclose the can with the removable can lid 25 until needed.

Various changes and departures may be made to the invention without departing from the spirit and scope thereof. Accordingly, it is not intended that the invention be limited to that specifically described in the specification or as illustrated in the drawings but only as set forth in the claims.

What is claimed is:

1. A can telescope comprising:

a container being that of a pop or soda can with a side wall and having a removable compartment cap at a back end thereof and a removable can lid also at said back end thereof and further having a storage compartment therein;

a base tubular section fixedly retained inside of said container and being smaller than that of said container;

a plurality of telescopic tubular sections of different sizes and being slidable within said base tubular section with one of said telescopic tubular sections being retentively extendable from another one of said telescopic tubular sections; and a plurality of lenses disposed in said tubular sections for viewing distant objects.

2. A can telescope as described in claim 1, wherein said removable compartment cap at said back end of said container is that of a ring having an opening therethrough.

3. A can telescope as described in claim 2, wherein said can lid at said back end of said container is that of a top end of said pop or soda can, said can lid having a void area therein for storage.

4. A can telescope as described in claim 1, wherein said base tubular section has a side wall, a front end and a flange portion extending outward of said side wall near said front end of said base tubular section for retaining said base tubular section inside said container.

5. A can telescope as described in claim 4, further includes a pair of gaskets fixedly attached to the interior of said container and to either side of said flange portion of said base tubular section to fixedly retain said base tubular section inside of said container and to make said front end of said container essentially leak resistant.

6. A can telescope as described in claim 4, wherein each of said tubular sections which is adapted to receive another of said tubular sections, has a respective stopper member fixedly attached in the interior thereof for preventing another of said tubular sections from being completely removed from therein.

7. A can telescope as described in claim 6, wherein each of said telescopic tubular sections has a side wall, front end, back end, and a flange portion which prevents a respective one of said telescopic tubular sections from being removed completely from within another of said telescopic tubular sections, said flange portion of a respective one of said telescopic tubular sections being contactable with and stopped by said stopper member of another of said telescopic tubular sections.

8. A can telescope as described in claim 4, wherein said storage compartment is defined as being between said container and said base tubular section and is adapted to store objects or liquid therein, said storage compartment being exposed upon said removable compartment cap being removed and being closed upon said removable lid being put over said back end of said container.

9. A can telescope as described in claim 8, wherein said storage compartment is defined as being between said side wall of said container and said side wall of said base tubular section.

\* \* \* \* \*